(12) United States Patent
Satake et al.

(10) Patent No.: US 6,707,521 B2
(45) Date of Patent: Mar. 16, 2004

(54) ELECTRONIC DEVICE AND METHOD OF MANUFACTURING THE SAME

(75) Inventors: Rumo Satake, Kanagawa (JP); Yoshiharu Hirakata, Kanagawa (JP); Takeshi Nishi, Kanagawa (JP); Shunpei Yamazaki, Tokyo (JP)

(73) Assignee: Semiconductor Energy Laboratory Co., Ltd. (JP)

(*) Notice: Subject to any disclaimer, the term of this patent is extended or adjusted under 35 U.S.C. 154(b) by 0 days.

(21) Appl. No.: 10/200,558

(22) Filed: Jul. 22, 2002

(65) Prior Publication Data

US 2003/0058392 A1 Mar. 27, 2003

Related U.S. Application Data

(63) Continuation of application No. 09/332,792, filed on Jun. 14, 1999, now Pat. No. 6,426,787.

(30) Foreign Application Priority Data

Jun. 16, 1998 (JP) .......................................... 10-167980

(51) Int. Cl.[7] ..................... G02F 1/1333; G02F 1/1335
(52) U.S. Cl. .................... 349/138; 349/114; 349/113
(58) Field of Search .................................. 349/138, 114, 349/113, 112, 147

(56) References Cited

U.S. PATENT DOCUMENTS

| | | | |
|---|---|---|---|
| 4,470,669 A | | 9/1984 | Kubota et al. |
| 4,556,288 A | | 12/1985 | Sekimura |
| 4,822,144 A | * | 4/1989 | Vriens ........................ 350/339 |
| 5,105,289 A | | 4/1992 | Sonehara et al. |
| 5,132,814 A | | 7/1992 | Ohkouchi et al. |
| 5,453,859 A | * | 9/1995 | Sannohe et al. ............... 359/63 |
| 5,526,149 A | | 6/1996 | Kanbe et al. |
| 5,587,816 A | * | 12/1996 | Gunjima et al. ............... 349/62 |
| 5,610,741 A | | 3/1997 | Kimura |
| 5,643,826 A | | 7/1997 | Ohtani |
| 5,648,277 A | * | 7/1997 | Zhang et al. .................. 437/21 |
| 5,673,127 A | | 9/1997 | Takahara et al. |
| 5,805,252 A | * | 9/1998 | Shimada et al. ............ 349/113 |
| 5,875,008 A | | 2/1999 | Takahara et al. |
| 5,923,962 A | | 7/1999 | Ohtani et al. |
| 5,926,240 A | * | 7/1999 | Hirota et al. ................ 349/114 |
| 5,943,109 A | | 8/1999 | Kim |
| 6,124,912 A | * | 9/2000 | Moore ......................... 349/113 |
| 6,292,246 B1 | | 9/2001 | Shinohara et al. ........... 349/143 |
| 6,426,787 B1 | * | 7/2002 | Satake et al. ................ 349/138 |

FOREIGN PATENT DOCUMENTS

| | | |
|---|---|---|
| JP | 06 160822 | 6/1994 |
| JP | 07 130652 | 5/1995 |
| JP | 07 135318 | 5/1995 |
| JP | 08 101383 | 4/1996 |
| JP | 09 312260 | 12/1997 |

OTHER PUBLICATIONS

English abstract re JP 06 160822.
English abstract re JP 07 130652.
English abstract re JP 07 135318.
English abstract re JP 09 312260.

* cited by examiner

*Primary Examiner*—Zhi Qiang Qi
*Assistant Examiner*—Mike Qi
(74) *Attorney, Agent, or Firm*—Cook, Alex, McFarron, Manzo, Cummings & Mehler, Ltd.

(57) ABSTRACT

To provide a novel and extremely effective structure of a liquid crystal display device in which the lowering of reflectivity due to the formation of orientation films can be prevented, a method of manufacturing the display device of the present invention comprises forming a concave or convex portion on a reflection electrode, forming a dielectric multi-layer film thereon, to thereby obtain the liquid crystal display device excellent in reflection characteristics and diffused reflection characteristics.

36 Claims, 11 Drawing Sheets

ELECTRONIC DEVICE AND METHOD OF MANUFACTURING THE SAME

This application is a continuation of copending U.S. application Ser. No. 09/332.792, filed on Jun. 14, 1999.

BACKGROUND OF THE INVENTION

1. Field of the Invention

The present invention relates to the structure of an electronic device such as personal computers and word processors, and more specifically, to a liquid crystal display (LCD) device equipped with the electronic device and a method of manufacturing a reflection layer in the liquid crystal display device. The present invention may also be applied to an electro-optical device having the liquid crystal display device.

A "semiconductor device" as used herein refers to a general device activated by a semiconductor. Therefore, the above-noted liquid crystal display device and the electro-optical device also fall within a category of semiconductor device. For clarification, the terms of "liquid crystal display device" and "electro-optical device" are separately used herein.

2. Description of Related Arts

Typically, a reflection type liquid crystal display device is known. The reflection type liquid crystal display device is more advantageous than a transmission type liquid crystal display device in that a lower power consumption may be achieved since no back light is used. Incidentally, the reflection type liquid crystal display device has been increasingly required for a direct-vision type display for mobile computers and video cameras.

FIG. 11 is a schematic view showing an example of a conventional structure. Referring to FIG. 11, between a substrate 10 and an opposing substrate 17 are provided switching elements 11 such as thin film transistors, an interlayer insulating film 12, pixel electrodes 13, an orientated layer 14, a liquid crystal layer 15, another orientated layer 14, and an opposite electrode 16 in the stated order from the top surface of the substrate 10. Incident light 20 is reflected by the pixel electrodes 13 to generate a reflection light 21. It is to be noted that although all components are not shown in FIG. 11, which is a schematic view, a number of switching elements and a number of pixel electrodes are formed in a matrix on the surface of the substrate 10.

The reflection type liquid crystal display device utilizes an optical modulating action of the liquid crystal to select the state where the incident light is reflected by the pixel electrodes to be outputted to the outside of the device and the state where the incident light is not outputted to the outside of the device, thereby allowing for the light or dark indication, and a combination thereof would allow an image to be displayed. Each pixel electrode is made of a metal with a high refractive index such as aluminum, and is electrically connected to a switching element such as a thin film transistor.

Such an operational principle causes a phenomenon in which in such a displaying state as a light display, that is, the state where the incident light from the external is reflected by the pixel electrodes to be outputted to the external of the device, the display attained by reflecting the incident light by the pixel electrodes as it is, like a mirror, may glare or darken depending upon a viewing angle. In other words, there occurs a phenomenon that the angle of vision may be narrowed.

This is caused by the fact that the reflection state of the incident light differs depend on its viewing angle of the user. In order to avoid such a problem, a need arises to devise the incident light so as to be reflected diffusely on the pixel electrode.

In general, to obtain a diffused reflection, the surface of the pixel electrode made of a metal material is subjected to light etching to form a fine concave or convex portion thereon.

Hitherto, such a problem has been arisen in which the reflectivity of the refection layer is lowered due to the formation of an orientated layer with a high refractive index on the reflection layer (pixel electrodes made of a metal material). For example, in the case where an orientated layer (having the reflectivity of 1.6) is formed on a vapor-deposited aluminum layer (having the reflectivity of 91.6%), the reflectivity is lowered to 87.4% in calculation, or is lowered to approximately 85% to 86% according to an actual experiment.

In addition, conventionally, formation of a concave or convex portion on the reflection layer causes a reflectivity to be reduced in nature.

The conventional method of forming the reflection layer on which the concave or convex portion is formed by etching encountered a limitation in terms of the depth of the concave or convex portion to be made deep. Accordingly, there was a problem with the conventional reflection layer (pixel electrode) in terms of brightness applicable to a liquid crystal display device (particularly, to a direct viewing reflection-type liquid crystal panel), since the reflection and diffused reflection of light (including diffusion and scattering) were not sufficient.

SUMMARY OF THE INVENTION

The present invention has been made to solve the foregoing problems, and therefore has an object of the present invention to provide a structure of a liquid crystal display device comprising a reflection layer in which an incident light is reflected and reflected diffusely more efficiently compared to a prior art, and a method of manufacturing the same.

According to a first aspect of the present invention disclosed in this specification, there is provided a liquid crystal display device comprising:

a pixel electrode made of a metal material, which is formed over a substrate; and a reflection layer formed of a dielectric multi-layer film, which is formed on the pixel electrode, characterized in that a concave or convex portion is formed on the surface of the pixel electrode.

In the foregoing structure, it is characterized in that the dielectric multi-layer film comprises a structure in which a thin film with a low reflective index and a thin film with a higher reflective index are laminated, film thickness $d_1$ of the thin film with a lower reflective index is so adjusted as to satisfy 400 nm$\leq \lambda_1 \leq$500 nm ($\lambda_1 = 4 n_1 d_1$), where the film thickness and the reflective index of the thin film with a low reflective index are $d_1$ and $n_1$, respectively, and a film thickness $d_2$ of the thin film with a high reflective index is so adjusted as to satisfy 450 nm$\leq \lambda_1 \leq$700 nm ($\lambda_2 = 4 n_2 d_2$), where the film thickness and the reflective index of the thin film with a high reflective index are $d_2$ and $n_2$, respectively.

In the foregoing structure, it is characterized in that the pixel electrode is made of aluminum, a material containing aluminum as a main component, silver, or a material containing silver as a main component.

In the foregoing structure, it is characterized in that the pixel electrode is formed on an interlayer insulating film in contact therewith, the interlayer insulating film being provided with a concave or convex portion formed on its surface.

In any one of the foregoing structure, it is characterized in that a liquid crystal is sealed between a pair of substrates, the liquid crystal display device comprising the pixel electrode arranged in a matrix manner on one substrate, a thin film transistor connected to the pixel electrode, and a reflection layer.

According to another aspect of the present invention disclosed in the present specification, there is provided a method of manufacturing a liquid crystal display device, characterized by comprising the steps of:

forming a switching element on a substrate;

forming a pixel electrode connected to the switching element, the pixel electrode being provided with a concave or convex portion on its surface; and forming a dielectric multi-layer film formed of a dielectric film on the top surface of the pixel electrode.

In the foregoing structure, it is characterized in that the step of forming the pixel electrode having the concave or convex portion on its surface comprises a step of forming a pixel electrode on an interlayer insulating film having the concave or convex portion on its surface.

Further, in the foregoing structure, it is characterized in that the step of forming the pixel electrode having the concave or convex portion on its surface comprises a step of etching the surface of the pixel electrode.

Still further, in the foregoing structure, it is characterized in that the step of forming the pixel electrode having the concave or convex portion on its surface comprises a step of subjecting the pixel electrode to an anodic oxidation.

Yet further, in the foregoing structure, it is characterized in that the step of forming the pixel electrode having the concave or convex portion on its surface comprises a step of forming protrusions by heating.

Further, in any one of the foregoing structure, it is characterized in that the step of forming the dielectric multi-layer film comprises a step of coating by spin coat.

Furthermore, in any one of the foregoing structure, it is characterized in that the step of forming the dielectric multi-layer film comprises a step of a sputtering method or a vacuum evaporation method.

DETAILED DESCRIPTION OF PREFERRED EMBODIMENTS

A reflective type liquid crystal display device according to the present invention is characterized in that pixel electrodes having a concave or convex portion on the surfaces thereof are formed, on which a dielectric multi-layer film (reflection layer) is laminated.

Figure 1:
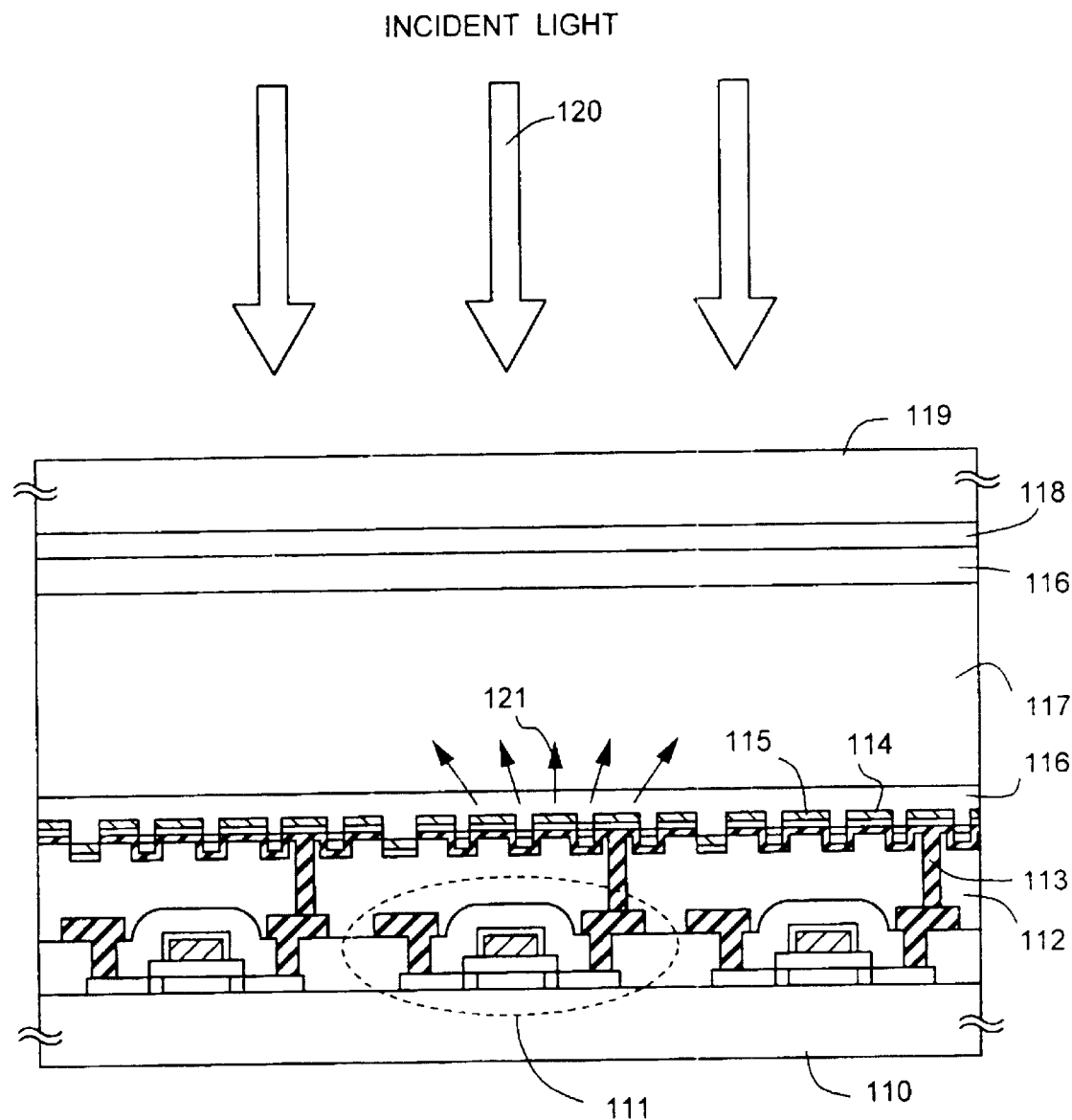
FIG. 1 is a sectional view showing an example of a structure according to the present invention.
Figure 2A:
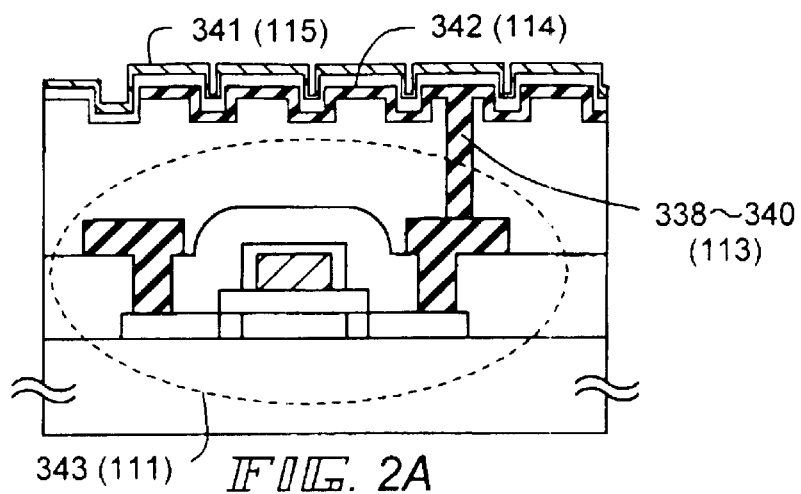
FIGS. 2A and 2C are sectional views showing examples of structures according to Embodiments 1 to 3 of the present invention.

FIG. 1 is a simplified sectional view showing an example of the structure of the present invention. Also, FIG. 2A is a view briefly showing an enlarged pixel of FIG. 1.

A liquid crystal display panel of the present invention comprises switching elements 111, an interlayer insulating film 112, pixel electrodes 113, a dielectric multi-layer film with a low refractive index 114, a dielectric multi-layer film with a high refractive index 115, an orientated layer 116, a liquid crystal layer 117, another orientated layer 116 over a substrate 110 and an opposite electrode 118 formed over an opposite substrate 119 in the stated order.

The above pixel electrodes 113 are arranged in matrix through the interlayer insulating film 112 over the substrate 110, and are connected to the switching elements 111 such as thin film transistors. The pixel electrode is made of a material having sufficient reflection property such as aluminum or a material containing silver as a main component, and therefore incident light is reflected on the surface of the pixel electrode.

According to the present invention, a concave or convex portion is formed on the surfaces of the pixel electrode 113. The concave or convex portion formed on the surface of the pixel electrode allows the incident light to be reflected diffusely.

The concave or convex portion of the pixel electrode has a height on the order of several $\mu$m of the concave or convex portion [(a difference in a horizontal direction between the peak of (the convex (higher) portion) and the bottom of (the concave (lower) portion)]. Incidentally, 1 $\mu$m or less of the height of the concave or convex portion will be sufficient to realize a required diffused reflection. As shown in FIG. 2A corresponding to an enlarged view of FIG. 1, the height of the concave or convex portion of the pixel electrode is made uniform with the slant angle of the concave portion or the convex portion approaching the right angle would be preferable, since the dielectric multi-layer film formed on the pixel electrodes can be formed evenly in film thickness.

Methods of forming such concave or convex portion on the surface of the pixel electrode according to the present invention includes a method of using photolithography method in which the concave or convex portion is formed on an interlayer insulating film, the pixel electrodes are formed thereon, a method of applying an etching to the surface of the pixel electrode, a forming method under film forming condition of the pixel electrode, a method of forming an anodic oxide film on the surface of the pixel electrode, and a method of forming projections by means of a heating process, but are not limited thereto.

Further, according to the present invention, a dielectric multi-layer film constituting a reflection layer for reflecting the incident light is formed with covering the pixel electrodes having such concave or convex portion. This dielectric multi-layer film is formed by alternately laminating thin film with a low refractive index and thin film with a high refractive index several to several tens layers. It should be noted that the dielectric multi-layer film according to the present invention also functions as a protection layer for protecting pixel electrodes and switching elements from deterioration or the like due to light. In FIG. 1, the dielectric multi-layer film is formed of two layers consisting of a dielectric film with a low refractive index and a dielectric film with a high refractive index.

As materials to be used for the above-mentioned dielectric multi-layer film, among the thin films with a high refractive index having a refractive index of 1.8 to 6.0 with respect to the wavelength of incident light, $TiO_2$, $ZrO_2$, $Ta_2O_5$, ZnS, ZnSe, ZnTe, Si, Ge, $Y_2O_3$, $Al_2O_3$, and the like may be used for the dielectric film 115 with a high refractive index. Further, a transparent conductive film such as ITO (refractive index of 1.98) may be used.

Further, among the thin films with a low refractive index having a ratio of 0.7 or less with respect to the refractive index of the above-mentioned thin film with a high refractive index, $SiO_2$, $MgF_2$, $Na_3AlF_6$, and the like may be used for the dielectric film 114 with a low refractive index. It is to be noted that an orientated layer, acrylic, polyimide (refractive index of 1.5 to 1.6) may also be used as other material therefor.

In the present invention, however, the film thickness of the dielectric multi-layer films needs to be adjusted when used as the reflection layer so that the dielectric multi-layer film becomes $\lambda/4$ film at the center wavelength of a required reflection wavelength range. The $\lambda/4$ film in this specification refers to a film that satisfies a relation of $nd=\lambda/4$, where n is a refractive index, d is a film thickness, and $\lambda$ is a center wavelength.

For instance, in the case of using a dielectric film with a low refractive index ($SiO_2$: refractive index of 1.43), the range of film thickness of the dielectric multi-layer film to form the $\lambda/4$ film in the visible light region (400 nm<$\lambda$<700 nm) is 70 nm to 120 nm.

Further, in the case of using a dielectric film with a high refractive index ($ZrO_2$: refractive index of 2.04), the film thickness with which the dielectric multi-layer film becomes the $\lambda/4$ film in the visible light region (400 nm<$\lambda$<700 nm) is within a range of 49 nm to 85.8 nm.

In such dielectric multi-layer films in which the film thicknesses of the dielectric film with a low refractive index and dielectric film with a high refractive index are adjusted and the dielectric film with a low refractive index and the dielectric film with a high refractive index are alternately laminated (two or more layers), reflected light are enhanced with one another by an interference effect to efficiently improve the reflectivity, thereby being capable of obtaining a wavelength region of high reflectivity.

Further, although sputtering method, coating method, vacuum evaporation method and the like are enumerated as a process for forming the above-mentioned dielectric multi-layer film, the present invention is not particularly limited to those. In the present invention, the film formation method is not particularly limited if the film thickness of the dielectric multi-layer film formed on the pixel electrode becomes uniform.

Further, when priority is given to high reflectivity, the dielectric multi-layer films are preferably laminated with four layers, more preferably six layers. However, if manufacturing cost and yield take precedence, the number of layers is preferably as small as possible.

Incidentally, according to experimental results by the present inventors, even if the dielectric multi-layer film formed on the pixel electrode is laminated with two layers or four layers, there was no practical affect at all to the threshold characteristic and quickness to response of the liquid crystal.

Further, in the present invention, it is easy to employ a structure in which the film thickness or the material of the respective dielectric films is appropriately changed to selectively set the reflection wavelength.

Furthermore, the present inventors found out the best combination of the above-mentioned dielectric film with a low refractive index and dielectric film with a high reflective index through which high reflectivity can be obtained.

Figure 12A:
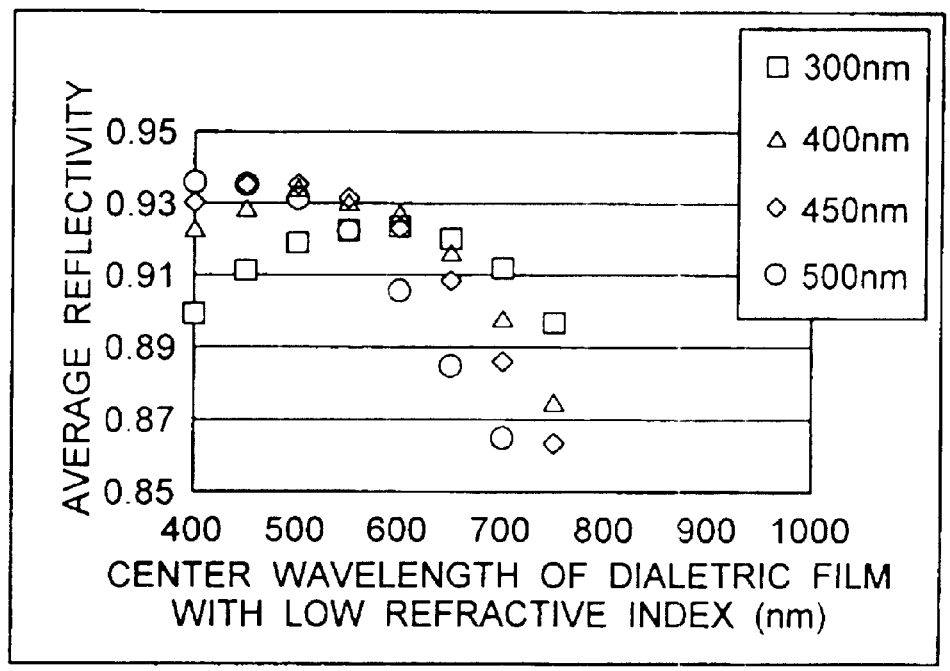
FIGS. 12A and 12B are graphs showing a dependency on a center wavelength by a dielectric film with a low refractive index.
Figure 12B:
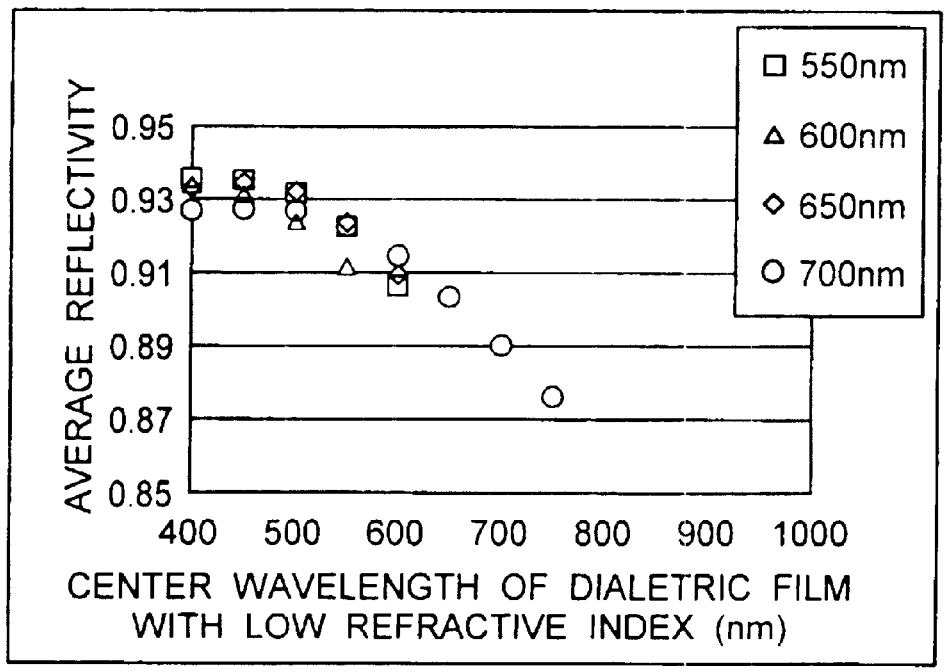

FIGS. 12A and 12B are simulation results showing a dependency on a center wavelength by an average reflectivity in a visible light region (300 nm<$\lambda$<700 nm) where dielectric multi-layer film is laminated with two layers. In the simulation, as a model, the dielectric film with a low refractive index ($SiO_2$: refractive index: 1.43) and the dielectric film with a high refractive index ($ZrO_2$: refractive index 204) which are formed on the Al—Ti film (refractive index: 0.961) having a flat surface, are used.

FIGS. 12A and 12B are graphs in which a center wavelength of the dielectric film with a low refractive index is plotted in an abscissa, and an average reflectivity in visible light region is plotted in a vertical line. In FIGS. 12A and 12B, one plot represents an average reflectivity in a visible light region. That is, by extracting the plot having an average reflectivity of 0.91 or more, optimum setting conditions for the center wavelength can be selected.

From FIGS. 12A and 12B, it can be found that even if the range of the film thickness of the dielectric film with a low refractive index ($SiO_2$) is adjusted to the film thickness (70 to 87.4 nm) so that the range of the center wavelength satisfies $\lambda_1$=400 to 500 nm, and even if the range of the film thickness of the dielectric film with a high refractive index ($ZrO_2$) is adjusted to the film thickness (55 to 85.4 nm) so that the range of the center wavelength satisfies $\lambda_2$=450 to 700 nm, high average reflectivity can be obtained in the visible region.

Accordingly, in the structure of the present invention, if the respective film thicknesses of the dielectric multi-layer films formed on the reflection electrodes having a concave or convex portion fall within the ranges described above, high average reflectivity can be sufficiently obtained in the visible region.

According to the present invention, provision of the reflection layer consisting of the above-mentioned dielectric multi-layer films (preferably two layers) allows to improve the efficiency in utilizing light (reflectivity, etc.) in comparison with the conventional structure, and to suppress the lowering of reflectivity due to the orientated layer, which has been a problem inherent in prior arts.

Embodiment 1

In the present embodiment, a process example for forming a pixel matrix circuit of a reflection type LCD using the present invention is described with reference to FIGS. 3A to 3D and 4A to 4C. Incidentally, since the present invention is a technique that relates to a reflection layer, the structure of a switching element such as the structure of a TFT itself is not limited to the present embodiment.

First, a substrate 301 having an insulating surface is prepared. For a substrate, a glass substrate, a quartz substrate, a ceramics substrate, a semiconductor substrate may be used. Then, an underlying film (not shown) is formed on the substrate. For the underlying film, a silicon oxide film, a silicon nitride film, a silicon nitride oxide film may be used in a film thickness of a range from 100 nm to 300 nm. In the present embodiment, a TEOS is used as a raw material, and the silicon oxide film is formed to have a film thickness of 200 nm. It is to be noted that if it is sufficiently flat like a quartz substrate, the underlying film may not be particularly formed.

Next, an active layer is formed on the substrate or the underlying film. The active layer may be formed of a crystalline semiconductor film (representatively, a crystalline silicon film) having a film thickness of a range from 20 nm to 100 nm (preferably, 25 nm to 70 nm). As the formation method of the crystalline silicon film, any of well-known methods, for example, a laser crystallization, a thermal crystallization or the like may be used. However, in the present embodiment, a catalytic element (nickel) is added to promote the crystallization at the time of crystallization. This technique is disclosed in detail in Japanese Patent Application Laid-open No. Hei 7-130652, Japanese Patent Application No. Hei 8-335152 and the like. Active layers 302 to 304 having a film thickness of 50 nm are obtained by patterning the crystalline silicon film in a usual photolithography step. It should be noted that only three TFTs are described in the present embodiment, but practically, a million or more TFTs are formed within a pixel matrix circuit.

Subsequently, a silicon oxide film having a film thickness of 150 nm is formed as a gate insulating film 305. As the gate insulating film 305, a silicon oxide film, a silicon nitride film, a silicon nitride oxide film or a laminated film of these may be used to have a film thickness of a range from 100 nm to 300 nm. Thereafter, a film mainly containing aluminum (not shown) is formed by using a target containing 0.2 wt % of scandium on the gate insulting film, and an island-like pattern that serves as a prototype of the gate electrode is formed by patterning.

In the present embodiment, a technique disclosed in Japanese Patent Application Laid-open No Hei 7-135318 is used. Incidentally, for details, reference will be made of the same publication.

First, an-anodic oxidation is carried out in 3% of oxalic acid solution, while a resist mask used in patterning is remained on the above-mentioned island-like pattern. In this case, a formation current of a range from 2 mV to 3 mV is allowed to flow using a platinum electrode as a cathode, and an ultimate voltage is made 8 V. Thus, porous anodic oxide films 306 to 308 are obtained.

Thereafter, an anodic oxidation is carried out in a solution neutralizing 3% of ethylene glycol solution of tartaric acid with aqueous ammonia after removing the resist mask. In this case, the formation current may be made to be within a range of 5 mV to 6 mV, and the ultimate voltage may be made to be 100 V. Thus, fine anodic oxide films 309 to 311 are formed.

Figure 3A:
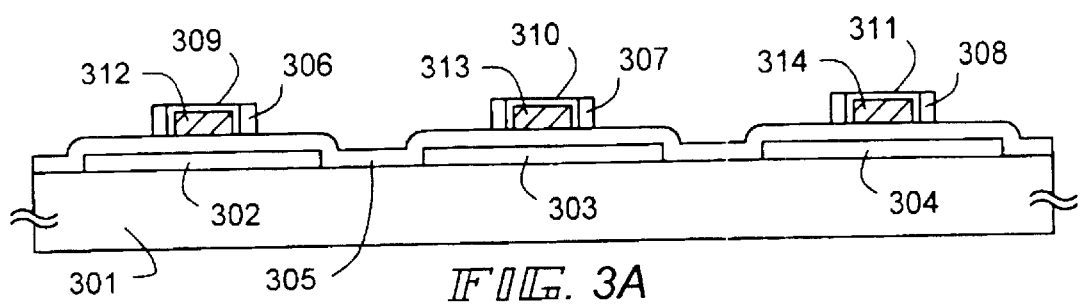
FIGS. 3A to 3D are sectional views showing an example of a manufacturing step according to Embodiment 1 of the present invention.

Then, the gate electrodes 312 to 314 are defined by the above-mentioned steps. It is to be noted that in the pixel matrix circuit, a gate line connecting each gate electrode at every one line is also formed at the same time when the gate electrode is formed (FIG. 3A).

Next, the insulating film 305 is etched using the anodic oxide films 306 to 311 and the gate electrodes 312 to 314 as the masks. Etching is carried out by dry etching using $CF_4$ gas. With a result, gate insulating films having a shape shown as 315 to 317 are formed.

Then, the anodic oxide films 306 to 308 are removed by etching, and impurity ions obtaining mono-conductivity in this state is added by ion-implantation or plasma doping. In this case, if the pixel matrix circuit is formed in an N-type TFT, P (phosphorous) ion may be added, whereas if the pixel matrix circuit is formed in a P-type TFT, B (boron) ion may be added thereto.

It is to be noted that adding step of the above-mentioned impurity ion is carried out by diving the step into two. A first time is carried out at high accelerating voltage of about 80 keV, and adjustment is performed so as to set a peak of the impurity ion under end portions (protrusions) of the gate insulating films 315 to 317. Then, a second time is carried out at a low accelerating voltage of about 5 keV, and adjustment is performed so that the impurity ion may not be added under the end portions (protrusions) of the gate insulating films 315 to 317.

Figure 3B:
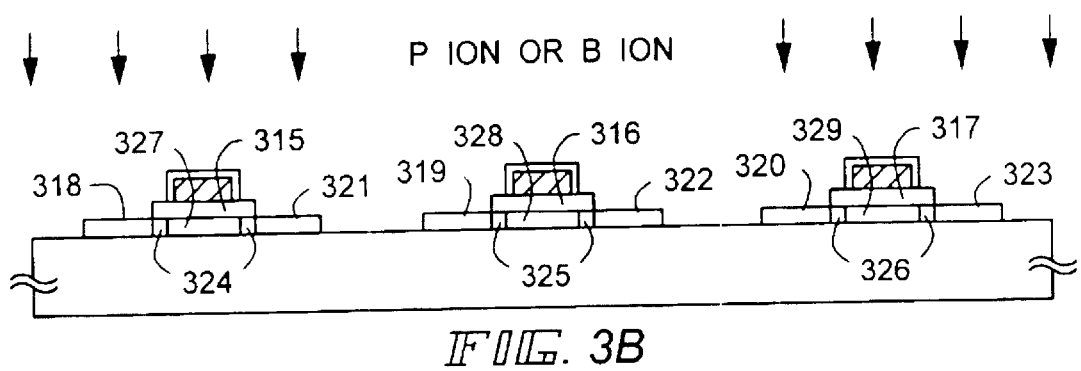

Thus, source regions 318 to 320, drain regions 321 to 323, lightly doped drain regions (also called as LDD region) 324 to 326, and channel formation regions 327 to 329 of TFT are formed (FIG. 3B).

At this time, it is preferable that impurity ions are added to a source/drain region at a degree so that a sheet resistance of a range from 300 Ω/square to 500 Ω/square may be obtained. Further, the lightly doped drain regions need to be optimized in correspondent with the performance of the TFT. Thermal treatment is conducted after the completion of the adding step of the impurity ions, and the activation of the impurity ions are carried out.

Figure 3C:
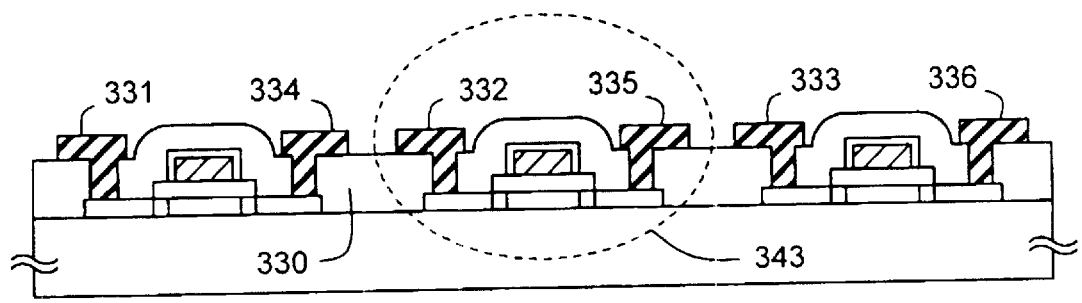

Next, a silicon oxide film is formed to have a film thickness of 400 nm as a first interlayer insulating film 330, and source electrodes 331 to 333 and drain electrodes 334 to 336 are formed thereon (FIG. 3C). It is to be noted that as the materials for the first interlayer insulating film, silicon oxide nitride or other insulating materials may be used other than a silicon oxide film.

It should be noted that in this specification, an element formed in a region indicated by 343 in FIG. 3C is called a switching element (representatively, TFT, MIM element is also acceptable). Also It is to be noted that in this specification, an interlayer insulating film 337 and a pixel electrode which are formed later are not included in the structure of the switching element.

Figure 3D:
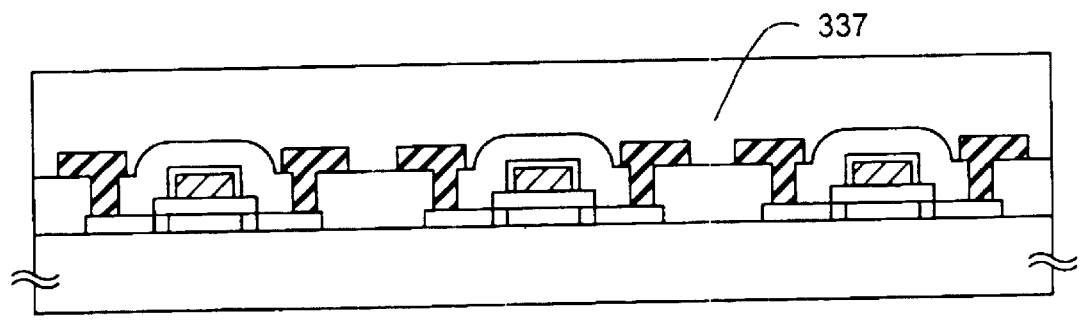

Next, a silicon oxide film is formed to have a film thickness of a range from 0.5 to 1 μm as a second interlayer insulating film 337. Further, as the materials for the second interlayer insulating film 337, a silicon oxide nitride film, an organic resin film or the like may be used. As the organic resin film, polyimide, polyamide, polyimide-amide, acrylic, or the like may be used. In the present embodiment, an acrylic film is formed to have a film thickness of 1 μm (FIG. 3D).

Figure 4A:
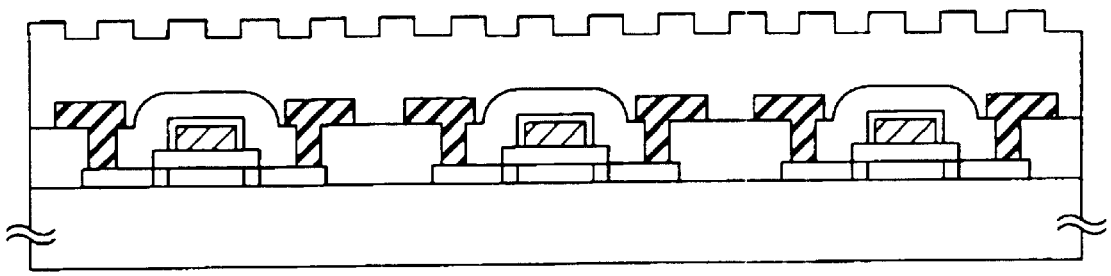
FIGS. 4A to 4C are sectional views showing an example of the manufacturing step according to Embodiment 1 of the present invention.

Then, a concave or convex portion is formed on the second interlayer insulating film 337 (FIG. 4A). Employed as the formation method of the concave or convex portion is a photolithography method. Since the concave or convex portion is formed by using masks, the shape, particularly, the depths of the concave portions become uniform (about several μm). It should be noted that the slant angles of the convex or concave portions are preferably rapid.

Figure 4B:
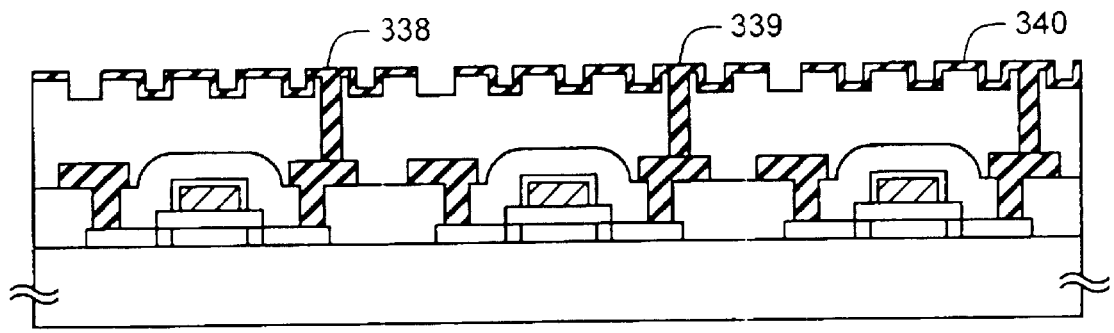

Subsequently, an aluminum film having a film thickness of 100 nm is formed using a target to which 1 wt % of titanium is added, and then formed pixel electrodes 338 to 340 by patterning. Thus, the state shown in FIG. 4B is obtained. In this case, the pixel electrodes are formed on the interlayer insulating film 337 having a concave or convex portion, the concave or convex portion is also formed on the pixel electrodes. It is needless to say that the other material may be used. It should be noted that, as in the present embodiment, if the pixel electrodes are formed so that boundary portions are formed on source wirings 331 to 333, the source wirings 331 to 333 may serve as black masks.

Incidentally, there may have a structure in which insulating films having light shielding property, such as organic resin films (also a solution coated-type silicone oxide film such as PSG) in which a black pigment or carbon is dispersed, are formed in the gaps between the pixel electrodes 338 to 340. With employment of this structure, even in the case where the source wiring becomes thin, or against light in an oblique direction, the insulating films may positively perform the light shielding function.

Subsequently, the dielectric multi-layer film is formed while covering the pixel electrodes having a concave or convex portion on the surface thereof. The dielectric multi-layer film is formed by alternately laminating several layers to several tens layers the dielectric film with a low refractive index and the dielectric film with a high refractive index while adjusting the film thicknesses thereof. It should be noted that the film thickness is so adjusted that $\lambda/4$ film is obtained at the center wavelength of a required reflection wavelength range. In the present embodiment, the dielectric multi-layer film is made up of a dielectric film 341 with a low refractive index and a dielectric film 342 with a high refractive index.

As materials to be used for the above-mentioned dielectric multilayer film, $SiO_2$, $MgF_2$, $Na_3AlF_6$, and the like may be used for the dielectric film 341 with a low refractive index. It is to be noted that an orientated layer, acrylic, polyimide (refractive index of 1.5 to 1.6) may also be used as other material therefor.

Further, for the dielectric film 342 with a high refractive index, $TiO_2$, $ZrO_2$, $Ta_2O_5$, ZnS, ZnSe, ZnTe, Si, Ge, $Y_2O_3$, $Al_2O_3$, and the like may be used. Also, a transparent conductive film such as ITO (refractive index of 1.98) may be used.

In the present embodiment, for the dielectric film 341 with a low refractive index, $SiO_2$ (refractive index of 1.43) is used, and for the dielectric film 342 with a high refractive index, $ZrO_2$ (refractive index of 2.04) is used.

Figure 4C:
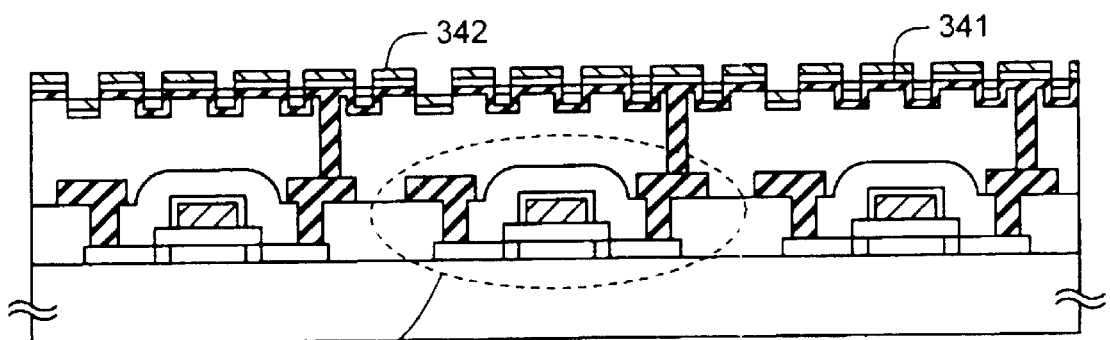

The film thickness of the dielectric multi-layer film is adjusted to form the $\lambda/4$ film in a visible light region (400 nm<$\lambda$<700 nm). The range of the film thickness of the dielectric film with a low refractive index ($SiO_2$) to form the $\lambda/4$ film in the above-mentioned visible light region is 70 nm to 122 nm. Further, the range of the film thickness of the dielectric film with a high refractive index ($ZrO_2$) to form the $\lambda/4$ film in the above-mentioned visible light region is 49 nm to 85.8 nm. If adjusted to such film thicknesses, light of required reflected wavelength band enhance with one another by an interference effect to effectively reflect the light. In the present embodiment, the dielectric multi-layer film is formed of two layers consisting of the dielectric film 341 with a low refractive index having a film thickness of 70 nm and the dielectric film 342 with a high refractive index having a film thickness of 50 nm (FIG. 4C). It should be noted that it is needless to say that the present invention is not limited to the material or the film thickness of each dielectric film described above, and it is possible to employ a structure in which the film thickness or the material of the respective dielectric films is appropriately changed to selectively set the reflection wavelength.

Furthermore, in the present embodiment, since the range of the film thickness of the dielectric film with a low refractive index ($SiO_2$) is adjusted to the film thickness (for example, 70 to 87.4 nm) so that the range of the center wavelength satisfies $\lambda_1$=400 to 500 nm, and the range of the film thickness of the dielectric film with a high refractive index ($ZrO_2$) is adjusted to the film thickness (for example, 55 to 85.8 nm) so that the range of the center wavelength satisfies $\lambda_2$=450 to 700 nm, extremely high average reflectivity can be obtained in the visible region.

If adjusted to such film thicknesses, light of required reflected wavelength band enhance with one another by an interference effect to effectively reflect the light. Incidentally, since the dielectric multi-layer film of the present embodiment is thin, voltage loss was such an extent being free from any problem for practical use.

To be noted, in the present embodiment, since it is desirable that the film thickness of the dielectric multi-layer films formed on the pixel electrodes are uniformly formed, sputtering method which is a well-known method is used. As the formation method of the above-mentioned dielectric multi-layer film, the present invention is not particularly limited to the present embodiment. Other methods including vacuum evaporation method, coating method, and the like are enumerated.

Next, the orientated layer is formed by a well-known method.

As described above, the pixel matrix circuit is completed. Practically, a driver circuit, etc. for driving pixel TFTs is simultaneously formed on the same substrate. Such a substrate is generally called as a TFT-side substrate or an active matrix substrate. The active matrix substrate is referred to as a first substrate in this specification.

After the formation of the first substrate is completed, an opposing substrate (this substrate is referred to as a second substrate in this specification) in which counter electrodes are formed on a transparent substrate is adhered thereonto, and a liquid crystal layer is sandwiched therebetween. Thus, a reflection type LCD is completed.

Incidentally, this cell assembling process may be carried out in accordance with a well-known method. Further, it is possible to disperse a dichroism pigment to the liquid crystal layer or to form a color filter on the opposing substrate. Since the kinds of the liquid crystal layer, presence/absence of the color filter or the like is changed depending upon by which mode the liquid crystal is driven, the operator may properly decide it.

The reflection type LCD obtained by the above-mentioned manufacturing process is shown in FIG. 1. FIG. 1 is a schematic sectional view of the present embodiment. Further, the dielectric film is not illustrated on the side wall of the concave portion shown in FIG. 1. However, the dielectric film is actually thinly formed as shown in FIG. 2A (simply enlarged view of one pixel shown in FIG. 1).

In a liquid crystal display panel manufactured in the present embodiment, between a substrate 110 and an opposing substrate 119, a switching element 111, an interlayer insulating film 112, pixel electrodes 113, dielectric films 114 with a low refractive index, dielectric films 115 with a high refractive index, an orientated layer 116, a liquid crystal layer 117, the orientated layer 116, and a counter electrode 118 are formed on the substrate 110 in the stated order.

It should be noted that, in this specification, the switching element indicates the element fabricated in accordance with a step shown in FIG. 3C. In other words, the element in which source electrodes 331 to 333 and drain electrodes 334 to 336 have been already formed is defined as the switching element.

Incidentally, FIG. 1 corresponds to FIGS. 3A to 3D and FIGS. 4A to 4C. The interlayer insulating film in FIG. 1 corresponds to a second interlayer insulating film 337 in FIG. 3D. The pixel electrodes 113 in FIG. 1 correspond to the pixel electrodes 338 to 340 in FIG. 4B. The dielectric films 114 with a low refractive index in FIG. 1 correspond to the dielectric films 341 in FIG. 4C, and the dielectric films 115 with a high refractive index in FIG. 1 correspond to the dielectric films 342 in FIG. 4C.

As described above, according to the present embodiment (consisting of pixel electrodes having a concave or convex portion thereon+dielectric multi-layer film+orientated film), the reflectivity can be improved and the lowering of reflectivity due to the formation of concave or convex portion and orientation films can be prevented as well.

Further, although it is not shown in the present embodiment, the color filter may be arranged between the opposing substrate and the counter electrode.

Embodiment 2

In Embodiment 1, an example of the fabrication process is described in which a concave or convex portion is formed on the second interlayer insulating film 337 to thereby form the concave or convex portion on the pixel electrodes. In the present embodiment, a description will be made of an example in which the pixel electrodes are subjected to etching to form the concave or convex portion thereon with reference to FIGS. 5A to 5C. It should be noted that until a process shown in FIG. 3C, the fabrication process is the same as that of the reflection type LCD shown in Embodiment 1. Therefore, only different portions will be described.

Figure 5A:
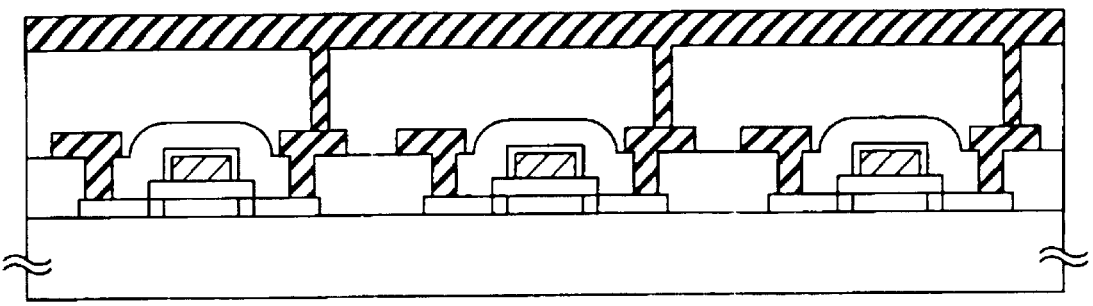
FIGS. 5A to 5C are sectional views showing an example of a structure according to Embodiment 2 of the present invention.

First, the structure shown in FIG. 3C is obtained using the same method as that of the fabrication process shown in Embodiment 1. Then, after opening of contact holes, aluminum film is formed to have a thickness of 100 nm (FIG. 5A).

Figure 5B:
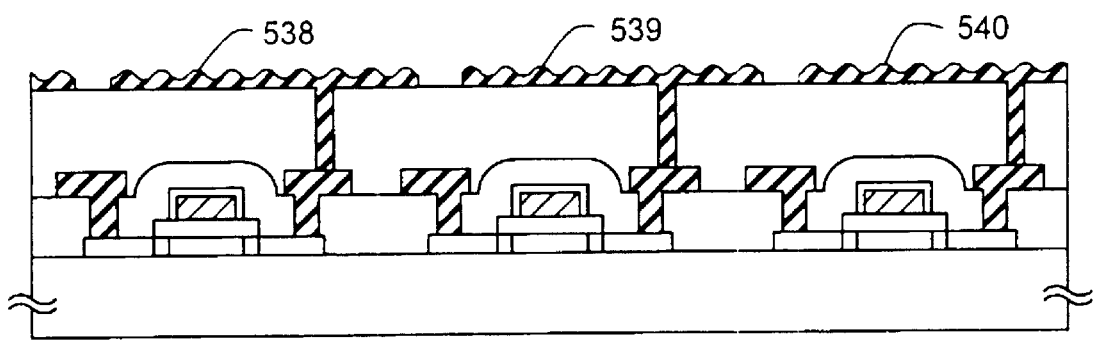

Then, the surface of the aluminum film is chemically etched by using an acid such as hydrogen fluoride solution, and pixel electrodes 538 to 540 are formed by patterning (FIG. 5B).

Thereafter, a dielectric multi-layer film is formed. As materials to be used for the above-mentioned dielectric multi-layer film, $SiO_2$, $MgF_2$, $Na_3AlF_6$, and the like may be used for the dielectric film 541 with a low refractive index. It is to be noted that an orientated layer, acrylic, polyimide (refractive index of 1.5 to 1.6) may also be used as other material therefor.

Further, for the dielectric film 542 with a high refractive index, $TiO_2$, $ZrO_2$, $Ta_2O_5$, ZnS, ZnSe, ZnTe, Si, Ge, $Y_2O_3$, $Al_2O_3$, and the like may be used. Also, a transparent conductive film such as ITO (refractive index of 1.98) may be used.

In the present embodiment, for the dielectric film 541 with a low refractive index, $SiO_2$ (refractive index of 1.43) is used, and for the dielectric film 542 with a high refractive index, $ZrO_2$ (refractive index of 2.04) is used.

The film thickness of the dielectric multi-layer film is adjusted to form the $\lambda/4$ film in a visible light region (400 nm<$\lambda$<700 nm). The range of the film thickness of the dielectric film with a low refractive index ($SiO_2$) to form the $\lambda/4$ film in the above-mentioned visible light region is 70 nm to 120 nm. In the present embodiment, the dielectric film with a low refractive index is formed to have a film thickness of 80 nm. Further, the range of the film thickness of the dielectric film with a high refractive index ($ZrO_2$) to form the $\lambda/4$ film in the above-mentioned visible light region is 49 nm to 85.8 nm. In the present embodiment, the dielectric film with a high refractive index is formed to have a film thickness of 80 nm. In the present embodiment, the range of the film thickness of the dielectric film with a low refractive index ($SiO_2$) is adjusted to the film thickness (70 to 87.4 nm) so that the range of the center wavelength satisfies $\lambda_1$=400 to 500 nm, and the range of the film thickness of the dielectric film with a high refractive index ($ZrO_2$) is adjusted to the film thickness (55 to 85.8 nm) so that the range of the center wavelength satisfies $\lambda_2$=450 to 700 nm. As a result, high average reflectivity can be obtained in the visible region FIG. 5C.

Figure 2B:
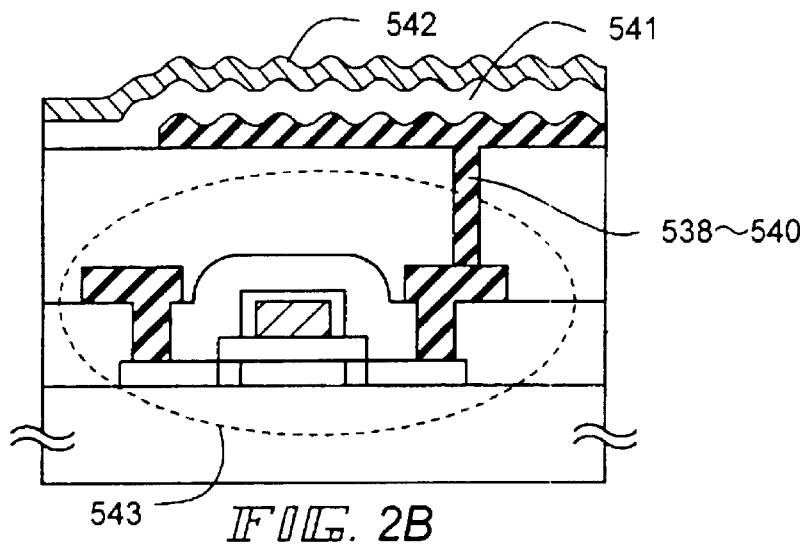
Figure 5C:
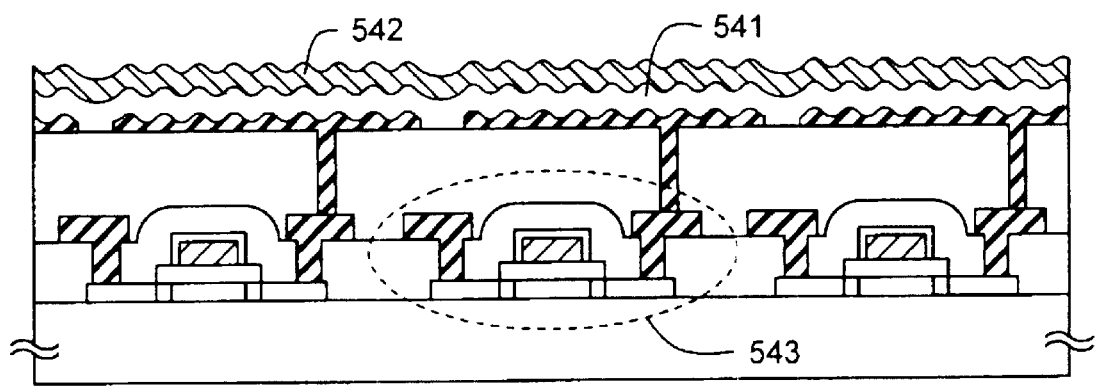

Incidentally, FIG. 2B shows an enlarged and simplified view of one pixel shown in FIG. 5C.

In the present embodiment, sputtering method which is a well-known method is used. As the formation method of the dielectric multi-layer film, the present invention is not particularly limited to the present embodiment. Other methods including vacuum evaporation method, coating method, and the like are enumerated.

At the step of forming the concave or convex portion on the pixel electrode, the concave or convex portion may be formed by grinding the pixel electrode per se.

Subsequent steps are the same as in Embodiment 1, thus completing the fabrication.

FIG. 2B shows an enlarged and simplified view of one pixel in the reflection type LCD obtained through the above manufacturing steps.

In this embodiment, despite that the concave or convex portion is formed also on the surface of the dielectric multi-layer film, the film is formed to have a uniform film thickness, so that the reflectivity may be enhanced with respect to every incident light from various angles to obtain an excellent characteristic in the angle of field of vision. In addition, more diffused reflection could be attained because of the concave or convex portions present on the surfaces of the pixel electrodes and the dielectric multi-layer film.

Embodiment 3

In Embodiment 1, an example of the fabrication process is described in which a concave or convex portion is formed on the second interlayer insulating film 337 to thereby form the concave or convex portion on the pixel electrodes. In the present embodiment, a description will be given below of an example in which anodic oxidation is applied to the pixel electrode to form on its surface the concave or convex portion. It should be noted that the manufacturing steps halfway up are the same as that of the reflection type LCD shown in Embodiment 1. Therefore, only different portions will be described.

First, the structure shown in FIG. 3C is obtained using the same method as that of the fabrication process shown in Embodiment 1. Then, after opening of contact holes, aluminum film is formed to have a thickness of 100 nm.

Then, anodic oxidation film is formed on the surface of the aluminum film using known anodic oxidation method, with the result that the concave or convex portion is formed thereon. Thereafter, pixel electrodes are formed by patterning. It should be noted that the anodic oxidation film formed on the surface of the material containing as main component aluminum is milk-white, thereby being capable of enhancing the scattering of light. In addition, the anodic oxidation method has such an advantage that the size of concave or convex portion can be easily controlled therewith.

Thereafter, a dielectric multi-layer film is formed. As materials to be used for the above-mentioned dielectric multi-layer film, $SiO_2$, $MgF_2$, $Na_3AlF_6$, and the like may be used for the dielectric film with a low refractive index. Further, for the dielectric film with a high refractive index, $TiO_2$, $ZrO_2$, $Ta_2O_5$, ZnS, ZnSe, ZnTe, Si, Ge, $Y_2O_3$, $Al_2O_3$, and the like may be used.

In the present embodiment, for the dielectric film with a low refractive index, $SiO_2$ (refractive index of 1.43) is used, and for the dielectric film with a high refractive index, $TiO_2$ (refractive index of 2.2) is used.

The film thickness of the dielectric multi-layer film is adjusted to form the $\lambda/4$ film in a visible light region (400 nm<$\lambda$<700 nm). The range of the film thickness of the dielectric film with a low refractive index ($SiO_2$) to form the $\lambda/4$ film in the above-mentioned visible light region is 70 nm to 122 nm. In the present embodiment, the dielectric film with a low refractive index is formed to have a film thickness of 80 nm. Further, the range of the film thickness of the dielectric film with a high refractive index ($TiO_2$) to form the $\lambda/4$ film in the above-mentioned visible light region is 45.5 nm to 79.5 nm. In the present embodiment, the dielectric film with a high refractive index is formed to have a film thickness of 70 nm.

In the present embodiment, coating method using spin coat is used. As the formation method of the dielectric multi-layer film, the present invention is not particularly limited to the present embodiment. Other methods including vacuum evaporation method, sputtering method, and the like are enumerated.

In the present embodiment, since coating method is used as described above, the surface of the dielectric multi-layer film has an excellent flatness. It should be noted that, in the present embodiment, in order to make uniform the film thickness of the dielectric multi-layer film (particularly, the film that contacts with the pixel electrodes), it is preferred that the size of concave or convex portion formed by the anodic oxidation film is made as small as possible.

Subsequent steps are the same as in Embodiment 1, thus completing the fabrication.

Figure 2C:
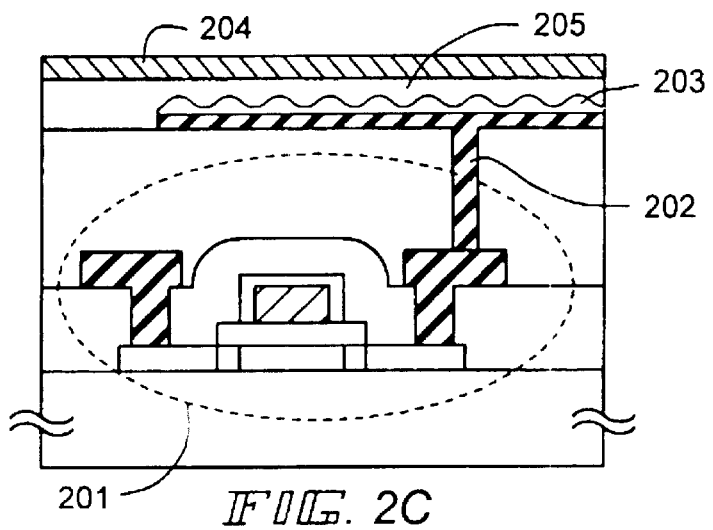

FIG. 2C shows an enlarged and simplified view of one pixel in the reflection type LCD obtained through the above manufacturing steps. Reference numeral 201 denotes a switching element; 202, a pixel electrode; 203, anodic oxidation film; 204, a dielectric film with a high refractive index; and 205, an orientated film (a dielectric film with a low refractive index).

In the present embodiment, the concave or convex portion formed by the anodic oxidation process is fine in size, with the result that the dielectric multi-layer film has a flat surface. Accordingly, a first substrate having an excellent flatness can be manufactured, thereby being capable of obtaining a liquid crystal panel having uniform cell gaps.

Embodiment 4

In Embodiment 1, an example of the fabrication process is described in which a concave or convex portion is formed on the second interlayer insulating film 337 to thereby form the concave or convex portion on the pixel electrodes. In the present embodiment, a description will be given below of an example in which heating treatment is applied to pixel electrodes to form on the surface thereof the concave or convex portion. It should be noted that the manufacturing steps halfway up are the same as that of the reflection type LCD shown in Embodiment 1. Therefore, only different portions will be described.

First, the structure shown in FIG. 3C is obtained using the same method as that of the fabrication process shown in Embodiment 1. Then, after opening of contact holes, aluminum film is formed to have a thickness of 100 nm Thereafter, heat treatment of the pixel electrode is carried out. The temperature and time period of heat treatment for the electrodes are not particularly limited, if the heat treatment is carried out within the range of 160 to 300° C. and 1 to 5 hours. In the present embodiment, the heat treatment was carried out by retaining 180° C. for one hour to generate protrusions (hillocks, whisker or the like).

Further, it may adopt the process in which aluminum grains (grain diameter is about several $\mu$m or less) are deposited to thereby form the concave or convex portion on the surface of the pixel electrodes. The deposition method is not particularly limited, and for example, there may adopt the technique such as heating a base, intentionally introducing water, or the like upon during a film formation process by general sputtering.

Aluminum film thus obtained can diffusely reflect incident light and can be in a state having an apparent cloudy white. Thereafter, pixel electrodes were formed by patterning.

Thereafter, a dielectric multi-layer film is formed. As materials to be used for the above-mentioned dielectric multi-layer film, $SiO_2$, $MgF_2$, $Na_3AlF_6$, and the like may be used for the dielectric film with a low refractive index. It is to be noted that an orientated layer, acrylic, polyimide (refractive index of 1.5 to 1.6) may also be used as other material therefor.

Further, for the dielectric film 115 with a high refractive index, $TiO_2$, $ZrO_2$, $Ta_2O_5$, ZnS, ZnSe, ZnTe, Si, Ge, $Y_2O_3$, $Al_2O_3$, and the like may be used. Also, a transparent conductive film such as ITO (refractive index of 1.98) may be used.

In the present embodiment, for the dielectric film 541 with a low refractive index, $SiO_2$ (refractive index of 1.43) is used, and for the dielectric film 542 with a high refractive index, $ZrO_2$ (refractive index of 2.04) is used.

The film thickness of the dielectric multi-layer film is adjusted to form the $\lambda/4$ film in a visible light region (400 nm<$\lambda$<700 nm). The range of the film thickness of the dielectric film with a low refractive index ($SiO_2$) to form the $\lambda/4$ film in the above-mentioned visible light region is 70 nm to 120 nm. In the present embodiment, the dielectric film with a low refractive index is formed to have a film thickness of 70 nm. Further, the range of the film thickness of the dielectric film with a high refractive index ($ZrO_2$) to form the $\lambda/4$ film in the above-mentioned visible light region is 49 nm to $87.5$ nm. In the present embodiment, the dielectric film with a high refractive index is formed to have a film thickness of 70 nm. In the present embodiment, the range of the film thickness of the dielectric film with a low refractive index ($SiO_2$) is adjusted to the film thickness (for example, 70 to 87.4 nm) so that the range of the center wavelength satisfies $\lambda_1$=400 to 500 nm, and the range of the film thickness of the dielectric film with a high refractive index ($ZrO_2$) is adjusted to the film thickness (55 to 85.8 nm) so that the range of the center wavelength satisfies $\lambda_2$=450 to 700 nm. As a result, high average reflectivity can be obtained in the visible region.

In the present embodiment, sputtering method which is a well-known method is used. As the formation method of the dielectric multi-layer film, the present invention is not particularly limited to the present embodiment. Other methods including vacuum evaporation method, coating method, and the like are enumerated.

Subsequent steps are the same as in Embodiment 1, thus completing the fabrication.

Embodiment 5

In the present embodiment, an example will be described in which a TFT having a structure different from the structure of the TFT shown in Embodiments 1 to 4 is utilized as a semiconductor device for driving an active matrix. It is to be noted that the TFT having the structure described in the present embodiment can be applied to the respective embodiments described above.

In Embodiments 1, a coplanar type TFT that is a representative one of top gate type TFTs is described as an example. However, it may be replaced by a bottom gate type TFT. Shown in FIG. 6 is an example where a reversed stagger type TFT as an exemplary bottom gate type TFT is used.

Figure 6:
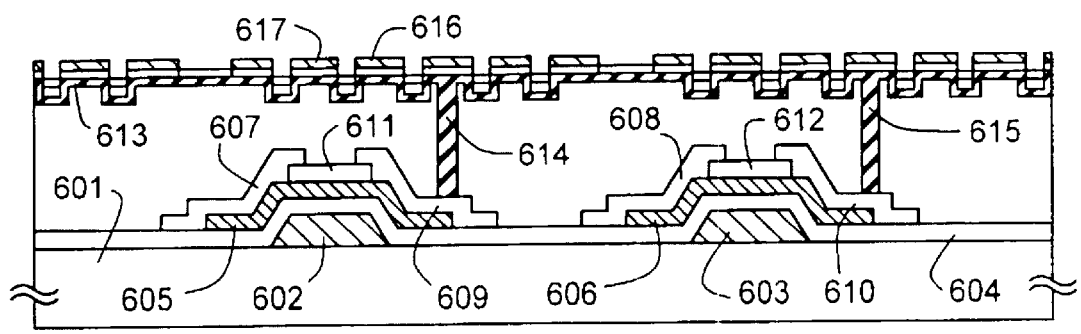
FIG. 6 is a sectional view showing an example of a structure according to Embodiment 5 of the present invention.

In FIG. 6, reference numeral 601 denotes a glass substrate; 602 and 603, gate electrodes; 604, a gate insulating film; 605 and 606, active layers. Each of the active layers 605 and 606 consists of a silicon film in which impurities are intentionally not added.

Further, reference numerals 607 and 608 denote source electrodes; 609 and 610, drain electrodes; 611 and 612, silicon nitride films to be channel stoppers (or etching stoppers). That is, of the active layers 605 and 606, regions disposed below the channel stoppers 611 and 612 function substantially as channel formation regions.

The above description is directed to the basic structure of the reversed stagger type TFT.

In the present embodiment, that sort of reversed stagger type TFT is covered with an interlayer insulating film 613 comprised of an organic resin film to form a concave or convex portion, and pixel electrodes 614 and 615 are formed thereon. Naturally, dielectric multi-layer films 616 and 617 are formed on the pixel electrodes.

Next, an example will be described in which an insulating gate type field effect transistor (IGFET) is formed as a semiconductor device of the present invention. Incidentally, IGFET is called also as MOSFET, and designates a transistor formed on a silicon wafer.

Figure 7:
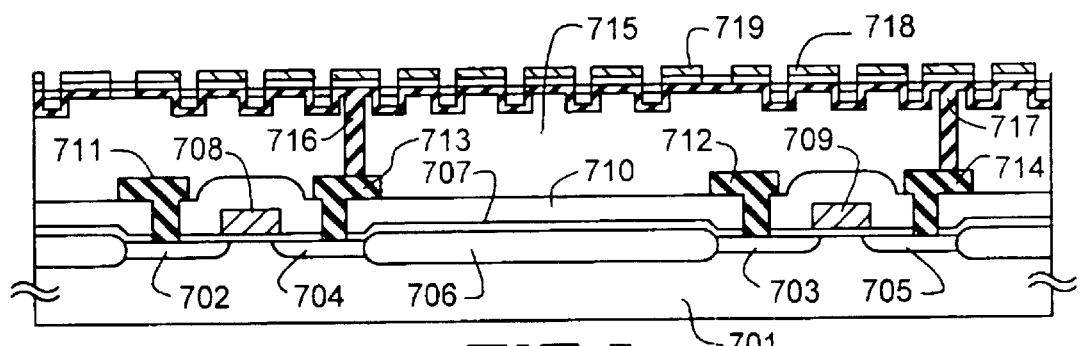
FIG. 7 is a sectional view showing an example of a structure according to Embodiment 5 of the present invention.

In FIG. 7, reference numeral 701 denotes a semiconductor substrate; 702 and 703, source regions; 704 and 705, drain regions. A source/drain region is formed by adding impurities through ion implantation and diffusing the impurities thermally. Further, reference numeral 706 denotes an oxide for separating a device, which can be formed using an ordinal technique of LOCOS.

A gate insulating film is denoted by reference numeral 707; gate electrodes by 708 and 709; a first interlayer insulating film by 710; source electrodes by 711 and 712; drain electrodes by 713 and 714. The top thereof is flattened by a second interlayer insulating film 715 to form on the flattened surface pixel electrodes 716 and 717. On the surfaces of the pixel electrodes, concave or convex portions are formed by utilizing the above-mentioned respective embodiments, and are varied by dielectric multi-layer films 718 and 719.

It should be noted that the present invention may be applied also to an active matrix display that uses a thin film diode, MIM device, varistor device, etc. other than IGFET, top gate type or bottom gate type TFT shown in the present embodiment.

As shown in the present embodiment, the present invention is applicable to a reflection type LCD using a semiconductor device having any structure.

Embodiment 6

An example is described in which an AMLCD is formed by using the first substrate (an element formation-side substrate) that includes the structures shown in Embodiments 1 to 5. Here, FIG. 8 shows an appearance of the AMLCD of the present embodiment.

Figure 8A:
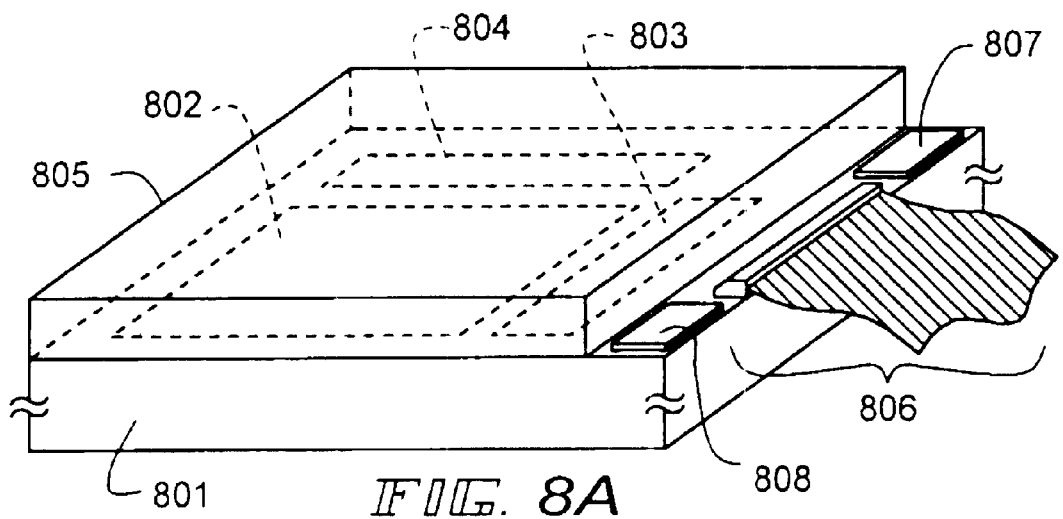
FIGS. 8A and 8B are perspective views showing an appearance of a liquid display panel according to Embodiment 6 of the present invention.

In FIG. 8A, reference numeral 801 denotes an active matrix substrate, and a pixel matrix circuit 802, a source-side driver circuit 803, and a gate-side driver circuit 804 are formed thereon. It is preferable that the driver circuit is made up of a CMOS circuit in which an N-type TFT and a P-type TFT are complementarily combined. Further, reference numeral 805 denotes an opposing substrate.

The AMLCD shown in FIG. 8A is formed by bonding an active matrix substrate 801 and the opposing substrate 805 while their end faces are aligned. However, a certain portion of the opposing substrate 805 is removed to expose the active matrix substrate, and an FPC (flexible print circuit) 806 is connected to the exposed active matrix substrate. This FPC 806 transmits an external signal to the inside of the circuit.

Further, an IC chips 807 and 808 are attached by using the surface on which the FPS 806 is mounted. These IC chips are constructed by various circuits such as a processing circuit of a video signal, a timing pulse generating circuit, a γ correction circuit, a memory circuit, and an arithmetic circuit which are formed on a silicon substrate. In FIG. 8A, an example is described in which two IC chips are formed. However, the number of the IC chips may be one, or a plurality of IC chips may be formed thereon.

Figure 8B:
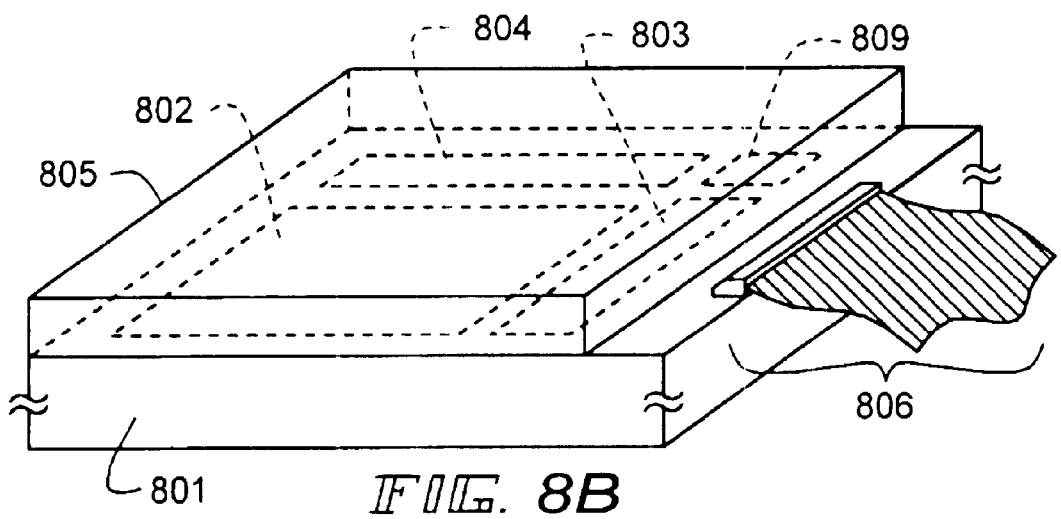

Further, the structure shown in FIG. 8B may be employed. In FIG. 8B, same reference numerals are given to the identical components. In FIG. 8B, an example is given in which a logic circuit 809 formed by a TFT on the same substrate performs a signal processing that has been performed by the IC chip in FIG. 8A. In this case, the logic circuit 809 is basically made up of the CMOS circuit as well as the driver circuits 803 and 804.

Further, display of color may be performed by using the color filter, or the liquid crystal may be driven by an ECB (electric field control birefringence) mode, a GH (guest host) mode, etc. without using the color filter.

Embodiment 7

The CMOS circuit or the pixel matrix circuit which have been formed by implementing the present invention may be employed for various electric optical devices (an active matrix type liquid crystal display device, an active matrix type EL display, or an active matrix type EC display). In other words, the present invention can be applied to all the electronic devices in which such electro-optical devices are incorporated as the display media.

As such electric devices, a video camera, a digital camera, a projector (rear-type projector or front-type projector), a head-mount display (goggle-type display), a navigation system for vehicle or the like, a personal computer, and a portable information terminal (a mobile computer, a cellular phone, or an electronic book) may be enumerated. Examples of those are shown in FIGS. 9A to 9F and 10A to 10D.

Figure 9A:
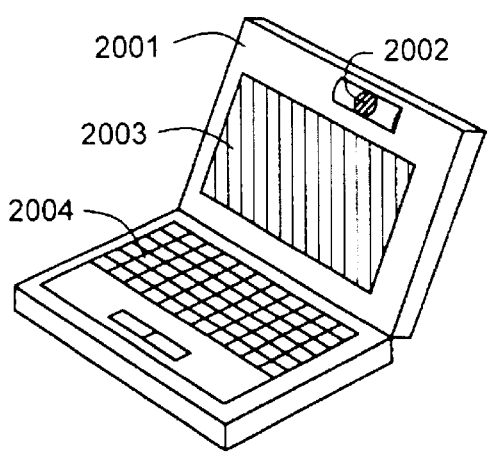
FIGS. 9A to 9F show examples of products to which the present invention is applied.

FIG. 9A shows a personal computer comprising a main body 2001, an image inputting unit 2002, a display device 2003, and a key board 2004. The present invention is applicable to the display device 2003.

Figure 9B:
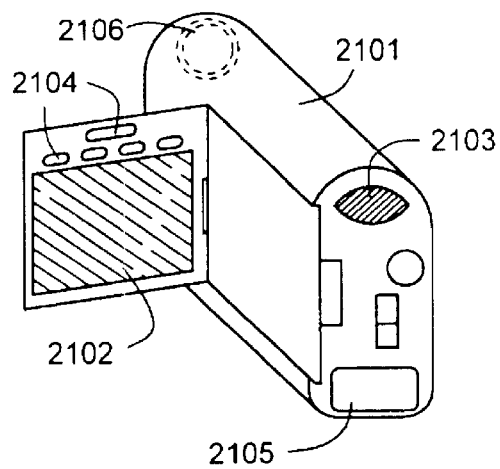

FIG. 9B shows a video camera comprising a main body 2101, a display device 2102, a voice input unit 2103, an operation switch 2104. a battery 2105. and an image receiving unit 2106. The present invention is applicable to the display device 2102.

Figure 9C:
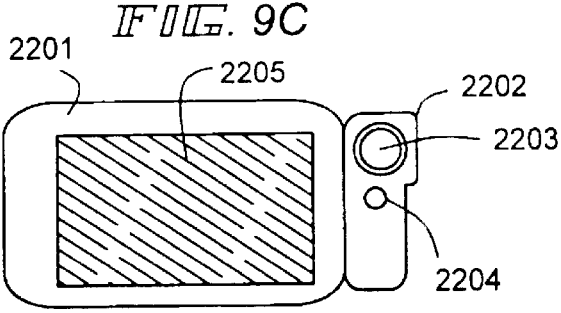

FIG. 9C shows a mobile computer comprising a main body 2201, a camera unit 2202, an image receiving unit 2203, an operation switch 2204, and a display device 2205. The present invention is applicable to the display device 2205.

Figure 9D:
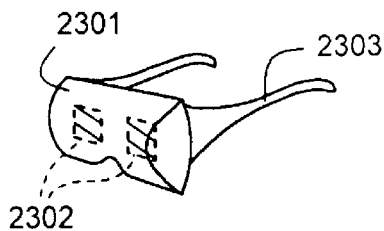

FIG. 9D shows a goggle-type display comprising a main body 2301, a display device 2302 and an arm portion 2303. The present invention is applicable to the display device 2302.

Figure 9E:
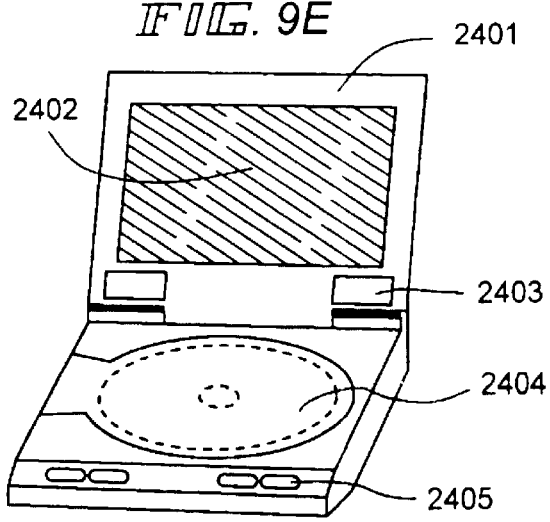

FIG. 9E shows a player that employs a recording medium on which programs are recorded (hereinafter referred to as recording medium), and comprises a main body 2401, a display device 2402, a speaker unit 2403, a recording medium 2404, and an operation switch 2405. Incidentally, this player has a function to enjoy music or movies and to conduct an Internet employing as the recording medium DVD (digital versatile disc), CD and the like. The present invention is applicable to the display device 2402.

Figure 9F:
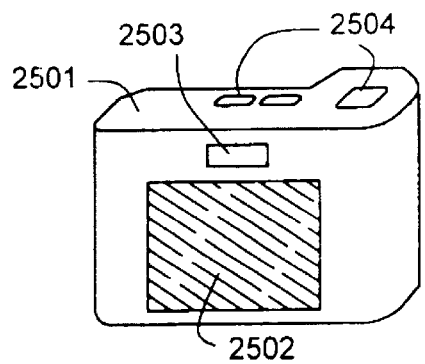

FIG. 9F shows a digital camera comprising a main body 2501, a display device 2502, an eye piece section 2503, an operation switch 2504, and an image receiving unit (not shown). The present invention is applicable to the display device 2502.

Figure 10A:
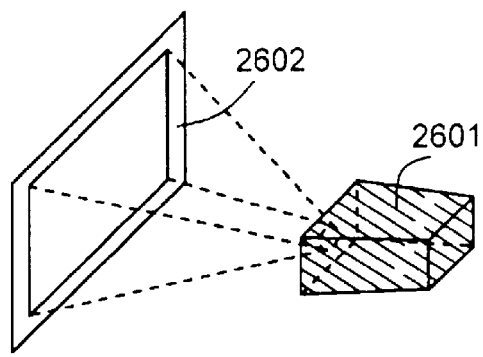
FIGS. 10A to 10C show examples of products to which the present invention is applied.

FIG. 10A shows a front-type projector comprising a display device 2601 and a screen 2602. The present invention is applicable to the display device.

Figure 10B:
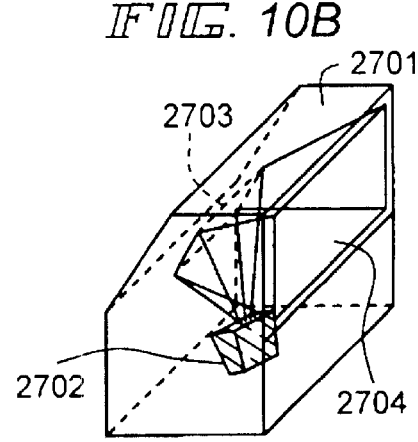

FIG. 10B shows a rear-type projector comprising a main body 2701, a display device 2702, a mirror 2703, and a screen 2704. The present invention is applicable to the display device and other signal control circuits.

Figure 10C:
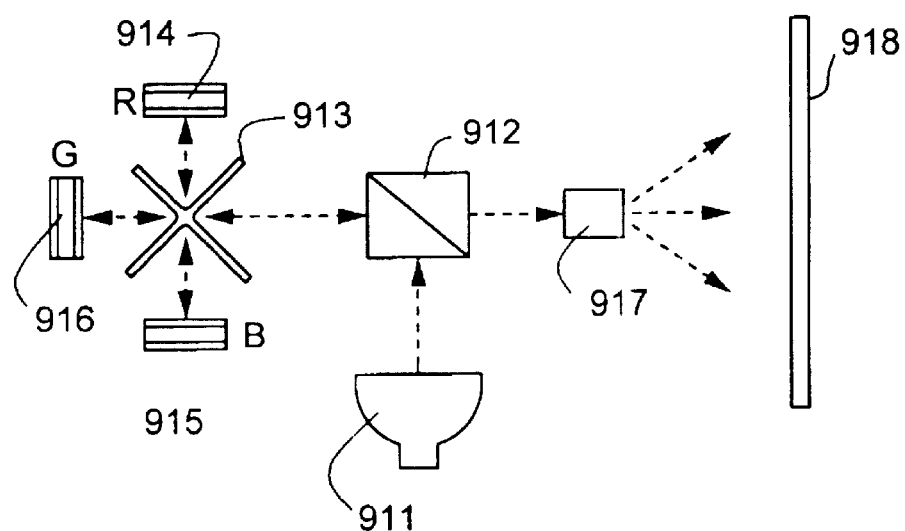
Figure 11:
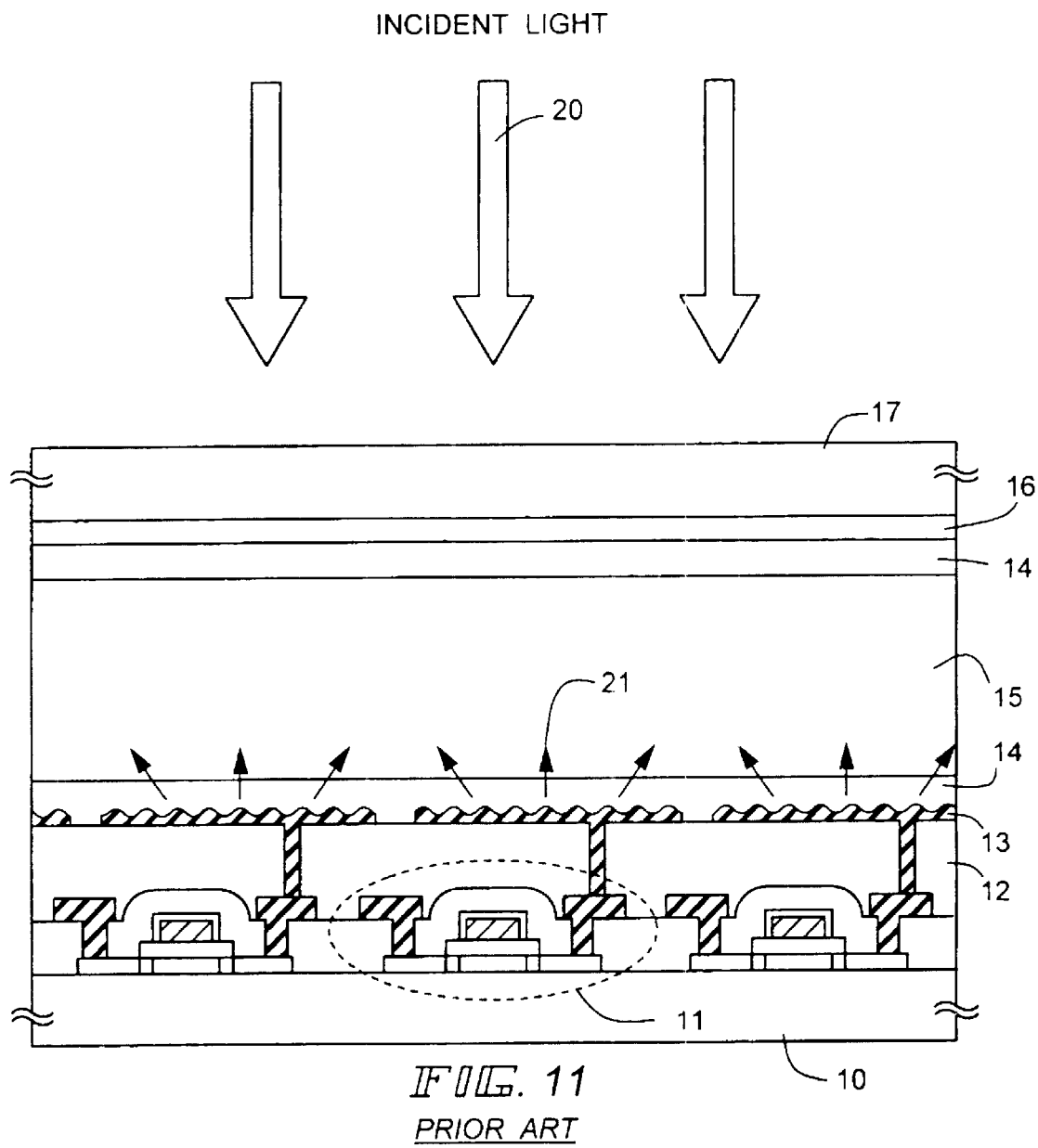
FIG. 11 is a sectional view showing an example of a conventional structure.

It is to be noted that FIG. 10C is a diagram showing an example of the structure of the display devices 2601 and 2702 in FIGS. 10A and 10B.

As shown in FIG. 10C. light including R (red), B (blue), and G (green) components that is output from a light source 911 such as a metal halide lamp or a halogen lamp is reflected by a polarizing beam splitter 912 so as to proceed to a crossed dichroic mirror 913.

The polarizing beam splitter is an optical filter having a function of reflecting or transmitting light depending on its polarization directions In this embodiment, the light emitted from the light source 911 is given such polarization that the light is reflected by the polarizing beam splitter 912.

The crossed dichroic mirror 913 reflects the R-component light and the B-component light toward an R liquid crystal panel 914 and a B liquid crystal panel 915, respectively. The G-component light passes through the crossed dichroic mirror 913 and enters a G liquid crystal panel 916.

In each of the liquid crystal panels 914 to 916, liquid crystal molecules are aligned so that the liquid crystal panel reflects incident light without changing its polarization direction if a pixel is in an off state. If a pixel is in an on state, the alignment direction of liquid crystal molecules is changed and accordingly incident light is subjected to a change in polarization direction.

After being reflected by the respective liquid crystal panels 914 to 916, the component beams are combined together in again being reflected by (R and B) or passing through (G) the crossed dichroic mirror 913. The combined light again enters the polarizing beam splitter 912.

At this time, light that was reflected by an on-state pixel region was changed in polarization direction and hence passes through the polarizing beam splitter 912. On the other hand, light that was reflected by an off-state pixel region was not changed in polarization direction and hence is reflected by the polarizing beam splitter 912.

As described above, by on/off-controlling pixel regions that are arranged in matrix form in the pixel matrix circuit with a number of semiconductor elements, only light beams that are reflected by particular pixel regions are allowed to pass through the polarizing beam splitter 912. This operation is common to the liquid crystal panels 914 to 916.

The light containing image information that has passed through the polarizing beam splitter 912 in the above manner is enlarged and projected onto a screen 918 by an optical lens 917 such as a projection lens.

As described above, the present invention has wide application range so that it is applicable to electric devices in any fields. In addition, the electronic devices according to the present embodiment can be realized by employing a structure consisting of any combination of Embodiments 1 to 6.

According to the present invention, if the film thickness, the number of layers of the dielectric multi-layer films, formed as the reflection layer on the pixel electrodes having a concave or convex portion on its surface, is appropriately changed, diffusion of light may be enhanced as well as being capable of reflecting light to the desired direction. As a result, the present invention is applicable as the liquid crystal display devices to be employed in the electronic devices in wide ranges.

The present invention can provide a liquid crystal panel with which display is more bright and is clearly observed compared to prior art.

What is claimed is:

1. An electronic device having at least one reflection type liquid crystal device, said reflection type liquid crystal device comprising:

a switching element formed over a first substrate;

an interlayer insulating film formed over the switching element and the first substrate;

a pixel electrode comprising a metal formed over the interlayer insulating film;

a reflection layer comprising a dielectric multi-layer film formed over the pixel electrode;

wherein a surface of the pixel electrode has a plurality of protrusions, wherein the dielectric multi-layer film comprises a first thin film having a first refractive index and a second thin film having a second refractive index formed on the first thin film;

wherein the second refractive index is higher than the first refractive index, wherein the second refractive index is in a range of 1.8 to 6.0, wherein the first refractive index has a ratio of 0.7 or less with respect to the second refractive index.

2. A device according to claim 1, wherein said dielectric multi-layer film comprises a first thin film having a lower refractive index and a second thin film having a higher refractive index, a film thickness $d_1$ of said first thin film is so adjusted as to satisfy 400 nm $\leq \lambda_1 \leq$ 500 nm ($\lambda_1 = 4\,n_1 d_1$), where the film thickness and the refractive index of said first thin film are $d_1$ and $n_1$, respectively, and a film thickness $d_2$ of said second thin film is so adjusted as to satisfy 450 nm $\leq \lambda_2 \leq$ 700 nm ($\lambda_2 = 4\,n_2 d_2$), where the film thickness and the refractive index of said second thin film are $d_2$ and $n_2$, respectively.

3. A device according to claim 1, wherein the pixel electrode comprises a material selected from the group consisting of aluminum and silver.

4. A device according to claim 1, wherein the pixel electrode is formed on the interlayer insulating film in contact therewith.

5. A device according to claim 1, wherein the reflection type liquid crystal device comprises:

a second substrate opposed to the first substrate;

a liquid crystal material sealed between the first and second substrate;

the pixel electrode being arranged in a matrix manner over the first substrates;

a thin film transistor being connected to the pixel electrode; and the reflection layer.

6. A device according to claim 1 wherein the electronic device is a personal computer.

7. A device according to claim 1, wherein the electronic device is a video camera.

8. A device according to claim 1, wherein the electronic device is a mobile computer.

9. A device according to claim 1, wherein the electronic device is a goggle-type display.

10. A device according to claim 1, wherein the electronic device is a player for operating at least one of a DVD or a CD.

11. A device according to claim 1, wherein the electronic device is a digital camera.

12. A device according to claim 1, wherein the electronic device is a projector.

13. A device according to claim 1, wherein the electronic device is a front type projector.

14. A device according to claim 1, wherein the interlayer insulating film comprises at least one material selected from the group consisting of a silicon oxide nitride film and an organic resin film, and the organic resin film includes at least one compound selected from the group consisting of polyimide, polyamide, polyimide-amide and acryl.

15. A device according to claim 1, wherein the first thin film comprises a material selected from the group consisting of $SiO_2$, $MgF_2$, $Na_3AlF_6$, acrylic, and polyimide and the second thin film comprises a material selected from the group consisting of $TiO_2$, $ZrO_2$, $Ta_2O_5$, ZnS ZnSe ZnTe, Si, Ge, $Y_2O_3$ and $Al_2O_3$.

16. A method of manufacturing an electronic device including at least a reflection type liquid crystal display device, said method comprising the steps of:

forming a switching element over a first substrate;

forming an interlayer insulating film over the switching element and the first substrate, said interlayer insulating film having a plurality of protrusions on a surface thereof;

forming a pixel electrode over the interlayer insulating film, said pixel electrode connected to a switching element wherein said pixel electrode extends over the plurality of protrusions so that the pixel electrode has a plurality of protrusions on a surface thereof; and forming a reflection layer comprising a dielectric multi-layer film over said pixel electrode, said dielectric multi-layer film including at least a first thin film and a second thin film formed on the first thin film, wherein the second thin film has a higher refractive index than the first thin film, wherein the second refractive index is in a range of 1.8 to 6.0, wherein the first refractive index has a ratio of 0.7 or less with respect to the second refractive index.

17. A method according to claim 16, wherein the plurality of protrusions is formed on the pixel electrode by etching the surface of the pixel electrode.

18. A method according to claim 16, wherein the step of forming the reflection layer comprises a step of coating by spin coat.

19. A method according to claim 16, wherein the step of forming the reflection layer comprises a step of a sputtering method or a vacuum evaporation method.

20. A method according to claim 16, wherein the plurality of protrusions are formed by subjecting the pixel electrode to an anodic oxidation.

21. A method according to claim 16, wherein the step of forming the reflection layer comprises a step of coating by spin coat.

22. A method according to claim 16, wherein the interlayer insulating film comprises at least one material selected from the group consisting of a silicon oxide nitride film and an organic resin film, and the organic resin film includes at least one compound selected from the group consisting of polyimide, polyamide, polyimide-amide and acryl.

23. A method according to claim 16, wherein the first thin film comprises a material selected from the group consisting of $SiO_2$, $MgF_2$, $Na_3AlF_6$, acrylic, and polyimide and the second thin film comprises a material selected from the group consisting of $TiO_2$, $ZrO_2$, $Ta_2O_5$, ZnS, ZnSe, ZnTe, Si, Ge, $Y_2O_3$ and $Al_2O_3$.

24. An electronic device having at least one active matrix liquid crystal device comprising:

a substrate;

a switching element formed over the substrate;

an interlayer insulating film formed over the substrate and the switching element, said interlayer insulating film having a first plurality of projections on a surface thereof;

a pixel electrode formed over the interlayer insulating film, wherein the pixel electrode has a second plurality of projections in its surface;

a reflection layer formed on the pixel electrode and comprising a first film and a second film formed on the first film, wherein the second film has a higher refractive index than the first film, wherein the second refractive index is in a range of 1.8 to 6.0, wherein the first refractive index has a ratio of 0.7 or less with respect to the second refractive index.

25. A device according to claim 24, wherein the electronic device is a personal computer.

26. A device according to claim 24, wherein the electronic device is a video camera.

27. A device according to claim 24, wherein the electronic device is a mobile computer.

28. A device according to claim 24, wherein the electronic device is a goggle-type display.

29. A device according to claim 24, wherein the electronic device is a player for operating at least one of a DVD or a CD.

30. A device according to claim 24, wherein the electronic device is a digital camera.

31. A device according to claim 24, wherein the electronic device is a projector.

32. A device according to claim 24, wherein the electronic device is a front type projector.

33. A device according to claim 24, wherein the interlayer insulating film comprises at least one material selected from the group consisting of a silicon oxide nitride film and an organic resin film, and the organic resin film includes at least one compound selected from the group consisting of polyimide, polyamide, polyimide-amide and acryl.

34. An active matrix display device comprising:

a switching element formed over a first substrate;

a first interlayer insulating film formed over the switching element;

a second interlayer insulating film comprising an organic resin formed over the first interlayer insulating film, a surface of said second interlayer insulating film having a plurality of first protrusions;

a pixel electrode formed over the plurality of first protrusions, a surface of said pixel electrode having a plurality of second protrusions;

a first dielectric layer formed over the pixel electrode;

a second dielectric layer formed on the first dielectric layer, wherein said second dielectric layer has a different refractive index from said first dielectric layer; and an orientation film formed on the second dielectric layer.

35. The active matrix display device according to claim 34 wherein the first dielectric layer comprises a material selected from the group consisting of $SiO_2$, $MgF_2$, $Na_3AlF_6$.

36. The active matrix display device according to claim 34 wherein the first dielectric layer comprises a material from the group consisting of $TiO_2$, $ZrO_2$, $Ta_2O_5$, $ZnS$, $ZnSe$, $ZnTe$, $Si$, $Ge$, $Y_2O_3$ and $Al_2O_3$.

* * * * *